United States Patent
Jaggi

[11] 3,873,244
[45] Mar. 25, 1975

[54] ELECTRICAL VARIABLE-SPEED DRIVE

[75] Inventor: Hans Jaggi, Zurich, Switzerland

[73] Assignee: Haeny & Cie, Zurich, Switzerland

[22] Filed: Aug. 13, 1973

[21] Appl. No.: 388,063

[30] Foreign Application Priority Data
Aug. 21, 1972 Switzerland............. 12364/72

[52] U.S. Cl.............. 417/424, 60/357, 415/122
[51] Int. Cl............................................ F04b 17/00
[58] Field of Search...... 60/330, 357, 358; 417/424; 415/122

[56] References Cited
UNITED STATES PATENTS

| | | | |
|---|---|---|---|
| 1,910,696 | 5/1933 | Kiep | 60/358 |
| 2,380,595 | 7/1945 | Hertrich | 60/357 |
| 2,441,356 | 5/1948 | Hertrich | 60/358 |
| 2,441,855 | 5/1948 | Trumpler | 60/358 |
| 2,580,072 | 12/1951 | Burnett | 60/357 |
| 2,652,688 | 9/1953 | Hudyma et al. | 60/358 |

Primary Examiner—C. J. Husar
Attorney, Agent, or Firm—Werner W. Kleeman

[57] ABSTRACT

An electric variable-speed drive, especially for driving a sewage or waste water pump, comprising an electric motor and a hydro-dynamic transmission unit connected after the electric motor, the degree of filling of the transmission unit with a fluid medium being variable. The transmission unit is arranged in a chamber of the motor housing containing the hydraulic fluid medium, and a conveyor mechanism is provided between the aforementioned chamber and a compartment of the motor for bringing about fluid medium exchange.

10 Claims, 1 Drawing Figure

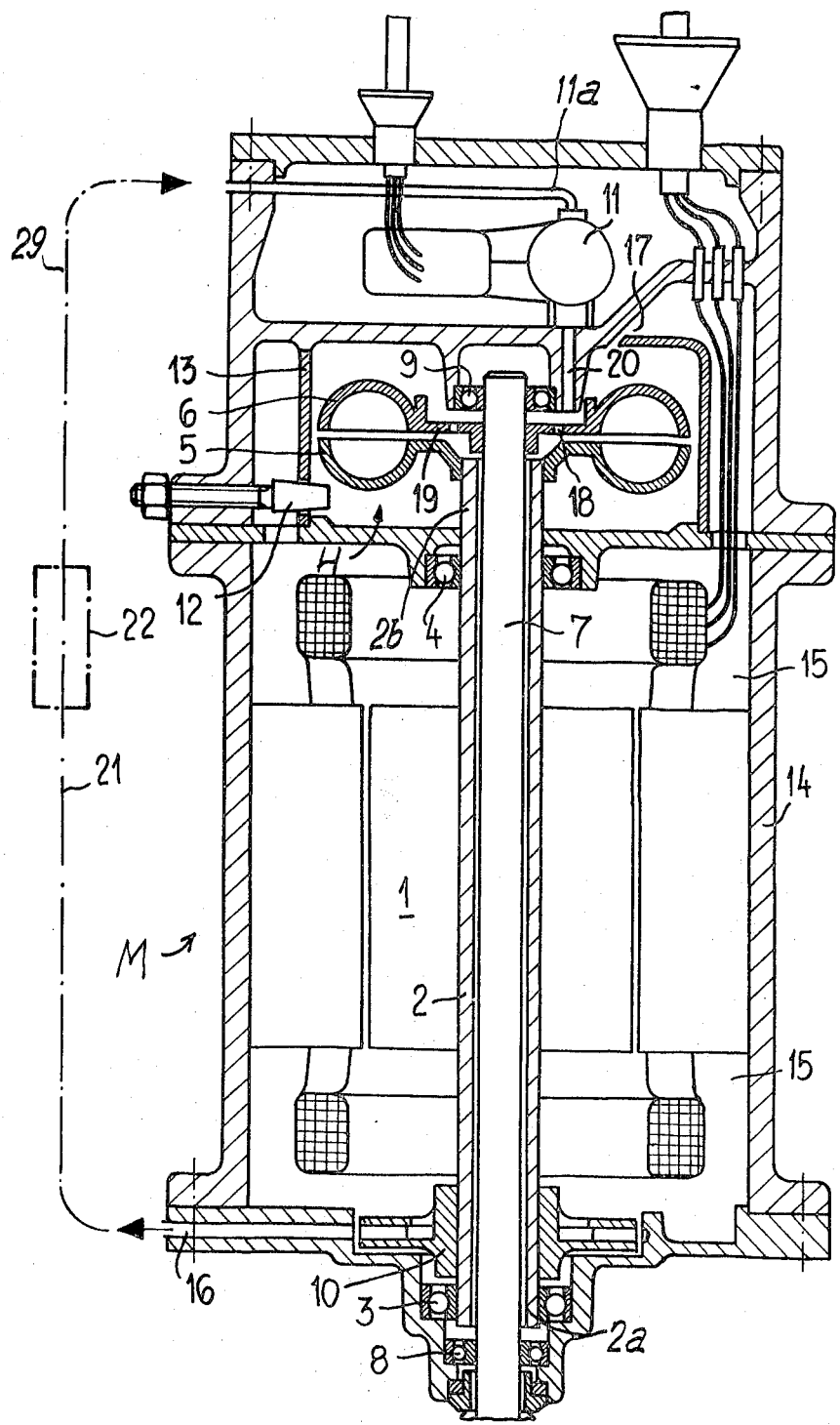

ELECTRICAL VARIABLE-SPEED DRIVE

BACKGROUND OF THE INVENTION

The present invention relates to a new and improved construction of an electrical variable-speed drive of the type incorporating an electric motor and a hydrodynamic transmission unit which is connected following the electric motor, and the degree of filling of the transmission unit with a fluid medium being variable.

With state-of-the-art variable speed drives of the aforementioned type, the electric motor on the one hand and the hydrodynamic transmission unit on the other hand constitute separate and independent structural units which are only in operable association with one another. This leads to an expensive constructional design, especially of the transmission unit, which can be a coupling as well as also a torque converter, particularly since such unit must be sealed with particular care. Further, special measures are additionally necessary in order to vary the degree of filling of the transmission unit, this being carried out for the purpose of influencing the rotational speed of the subsequently connected machines, typically a pump. For the most part, these circumstances have led to the fact that variable speed drives are only employed under certain conditions, namely when there is available sufficient space for the assembly together of the independent units, as such can occur for instance with a horizontal arrangement, and also when the price is justified, something which is usually only the situation for large outputs.

SUMMARY OF THE INVENTION

Hence, it is a primary object of the present invention to provide an improved construction of electric variable-speed drive which is not associated with the aforementioned drawbacks and limitations of the prior art constructions.

Yet a further significant object of the present invention relates to an improved construction of electrical variable-speed drive which is relatively simple in design, extremely compact, economical to manufacture, highly reliable in operation, and not readily subject to breakdown and malfunction.

Now in order to implement these and still further objects of the invention, which will become more readily apparent as the description proceeds, the inventive electric variable-speed drive is manifested by the features that the transmission unit is arranged in a chamber of the motor housing containing the hydraulic fluid medium and a conveyor device or mechanism is provided for the fluid exchange between the chamber and a compartment of the motor.

In accordance with such arrangement, such electrical variable-speed drive does not constitute an ad hoc assembly of independent components, rather it is conceived as a unitary machine or piece of equipment in which the electric motor and the hydro-dynamic transmission unit are functionally integrated with one another via their drive connection. Hence, singling out only one particular aspect, the motor compartment constitutes that fluid medium reservoir which is absolutely necessary for changing the degree of filling of the transmission unit. Moreover, in this construction there are dispensed with the special sealing problems for the transmission unit, since the same, so to speak, is not located in a deleterious (external-) atmosphere, rather within the confines of the motor housing. Consequently, there is realized a compact structure, associated with the freedom of being able to employ the unit in every random position and under extreme ambient conditions.

According to the invention, such type drive is employed for sewage or waste water pumps. In contrast to the present day state of the relevant technology, according to which the sewage or waste water is collected in chutes and conveyed away in steps or intermittently, the described drive permits accommodating the pump capacity to the prevailing quantity of sewage and to continuously convey the same, so that the chutes can be drastically decreased in size or in fact, even completely omitted, and the surge-like or intermittent load of the sewage purification plant with the correspondingly impaired purification effect can be avoided.

BRIEF DESCRIPTION OF THE DRAWING

The invention will be better understood and objects other than those set forth above, will become apparent when consideration is given to the following detailed description thereof. Such description makes reference to the annexed drawing wherein there has been shown a particularly suitable constructional embodiment of the invention in axial sectional view, but it should be understood that such is not solely limited to the herein given exemplary drive of a sewage pump constructed as an immersion pump, but can be used for other purposes.

DETAILED DESCRIPTION OF THE PREFERRED EMBODIMENTS

Describing now the drawing, a rotor 1 of an electric motor M is seated upon an essentially vertically directed hollow shaft 2 of such motor, this hollow shaft 2 in turn being mounted at locations 3 and 4 at the motor housing 14. The motor compartment 15 enclosed by the motor housing 14 is partially filled with a suitable hydraulic fluid or fluid medium which has not been particularly shown in the drawing. This fluid medium can be conveyed by means of a conveyor impeller or wheel 10 through an outlet or discharge 16, the conveyor impeller 10 constituting a conveying device being arranged at the lower end 2a of the hollow motor shaft 2.

At the other end 2b of the motor shaft 2 there is seated the primary impeller wheel 5 of a hydrodynamic transmission unit H, this primary impeller wheel cooperating with a secondary impeller wheel 6. The latter is mounted at a power take-off or output shaft 7 which piercingly extends through the hollow motor shaft 2, this power take-off shaft 7 in turn being rotatably mounted at bearing locations 8, 9 in the housing 14 and being connected at its lower end with for instance a sewage or waste water pump. The primary impeller wheel 5 and the secondary impeller wheel 6 are located in a chamber 13 within the motor housing 14. This chamber 13 in turn is connected via an adjustable throttle means 12 defining a throttle location with the motor compartment 15. By means of an opening 17 the air space of the chamber 13 is connected with that of the motor compartment 15.

Above the central portion 19 of the secondary impeller wheel 6 which is provided with the openings or throughpassages 18, there is located the inlet 20 of the chamber 13. This inlet 20 is provided with a controllable inlet valve 11, the inlet side 11a of which —as indicated by reference character 29 with broken lines— is connected with the outlet or discharge 16. At this connection there can be arranged a suitable cooling device for the hydraulic fluid medium, as the same has been schematically indicated by reference character 22.

With the illustrated arrangement, during operation the hydraulic medium is located in a closed circulation system which leads from the motor compartment 15, if desired via the cooling device 22, the inlet valve 11, the chamber 13, the throttle location 12 back to the motor compartment 15. Depending upon the adjustment of the inlet valve 11 (and of course the throttle location 12) there is thus realized a certain degree of filling of the chamber. With maximum degree of filling, the slip between the impeller wheels 5 and 6 is minimal and the power take-off shaft 7 is driven at a rotational speed which is only slightly less than that of the motor shaft 2. Now if the infeed to the chamber 13 is throttled with the aid of the inlet valve 11 and there is thus reduced the degree of filling thereof, then the slip between the primary impeller wheel 5 and the secondary impeller wheel 6 increases, with the result that the rotational speed of the power take-off shaft 7 is correspondingly reduced. The adjustment of the inlet valve 11 can be automatically influenced as a function of a regulation or control magnitude.

With the illustrated exemplary embodiment there is provided a hydro-dynamic coupling. However, it should be understood that instead of such coupling there can be arranged a torque converter and with the aid of which there can be additionally realized a speed conversion or transmission. Instead of the feed or conveyor impeller 10 there also could be provided a circulating pump which is incorporated in the transmission unit H or, however, an independent gear pump or the like. Naturally, it also would be possible to influence the degree of filling of the chamber with the aid of a controllable throttle location (i.e., without the inlet valve), wherein however also both measures could be employed. In such case there could be used, for instance, a three-way valve which simultaneously controls the infeed or outfeed. It should be understood that instead of the controllable inlet valve 11 it would be possible to employ a number of calibrated inlet valves, for instance magnetic valves.

The power take-off also could be removed from the power take-off shaft 7 at the secondary impeller side. The drive shaft can be directly mounted in the hollow shaft 3.

In each instance there is realized a compact arrangement which can be employed independent of position and which is especially suitable for flooded motors or those which are safeguarded against flooding and in conjunction therewith for the drive of immersion pumps, especially sewage pumps. What is of significance of course for this last environment of use is the soft starting characteristics of the motor and the pump owing to the hydro-dynamic transmission unit.

While there is shown and described present preferred embodiments of the invention, it is to be distinctly understood that the invention is not limited thereto, but may be otherwise variously embodied and practiced within the scope of the following claims.

Accordingly, what is claimed is:

1. An electric variable-speed drive, especially for the drive of a sewage pump, comprising an electric motor, a hydrodynamic transmission unit which is arranged after the electric motor, the electric motor comprising a motor housing having a chamber and a motor compartment, said chamber containing a hydraulic fluid medium, said motor compartment containing hydraulic fluid medium and serving as a reservoir for the chamber, the transmission unit being arranged in said chamber of the motor housing containing the hydraulic fluid medium, and a conveyor device provided between the chamber containing the transmission unit and the motor compartment containing the motor for the exchange of the fluid medium between said chamber and said compartment in order to influence the degree of filling of the chamber with the hydraulic fluid medium to thus control the output of the transmission unit.

2. The electric variable-speed drive as defined in claim 1, wherein the conveyor device, the motor compartment and the chamber are connected in a closed circulation system.

3. The electric variable-speed drive as defined in claim 2, wherein said chamber has an outlet, and means providing an adjustable throttle location provided at said outlet of the chamber.

4. The electric variable-speed drive as defined in claim 3, wherein the chamber has an inlet, a controllable inlet valve provided for said inlet to the chamber.

5. The electric variable-speed drive as defined in claim 4, wherein the conveyor device is arranged in the motor compartment and the same is connected with the chamber via the throttle location.

6. The electric variable-speed drive as defined in claim 5, wherein the motor compartment and the chamber incorporate intercommunicating air spaces.

7. The electric variable-speed drive as defined in claim 6, wherein the electric motor has a substantially vertical motor shaft having a lower end, the conveyor device incorporating an impeller mounted at the lower end of the vertical motor shaft, the transmission unit having a primary impeller wheel which is mounted at the other end of the motor shaft which extends into the chamber arranged above the motor compartment.

8. The electric variable-speed drive as defined in claim 7, wherein the transmission unit has a secondary impeller wheel arranged above the primary wheel, the chamber having an inlet, the secondary impeller wheel having a central portion provided with openings, the inlet of the chamber being arranged directly over the central portion of the secondary impeller wheel.

9. The electric variable-speed drive as defined in claim 8, wherein the motor shaft is constructed as a hollow shaft, a power take-off shaft piercingly extending through said hollow shaft, said secondary impeller wheel being seated upon said power take-off shaft.

10. The electric variable-speed drive as defined in claim 1, further including means for varying the degree of filling of the transmission unit with the fluid medium.

* * * * *